W. M. NEEPER.
WRECK SALVAGING APPARATUS.
APPLICATION FILED FEB. 8, 1919.

1,349,578.

Patented Aug. 17, 1920.
7 SHEETS—SHEET 1.

INVENTOR
William M. Neeper.
BY
Charles E. Wiener
ATTORNEY.

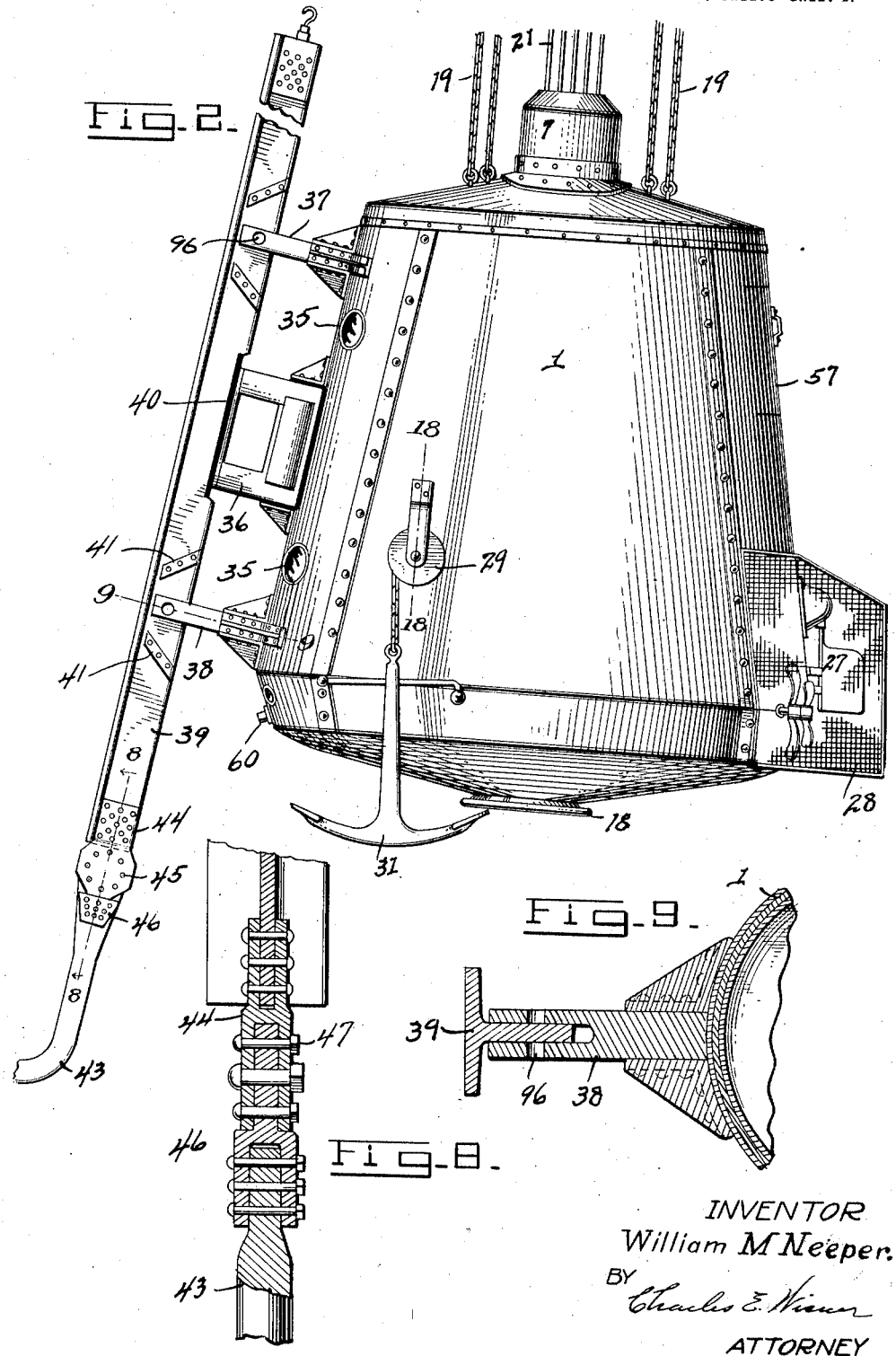

W. M. NEEPER.
WRECK SALVAGING APPARATUS.
APPLICATION FILED FEB. 8, 1919.
1,349,578.
Patented Aug. 17, 1920.
7 SHEETS—SHEET 3.
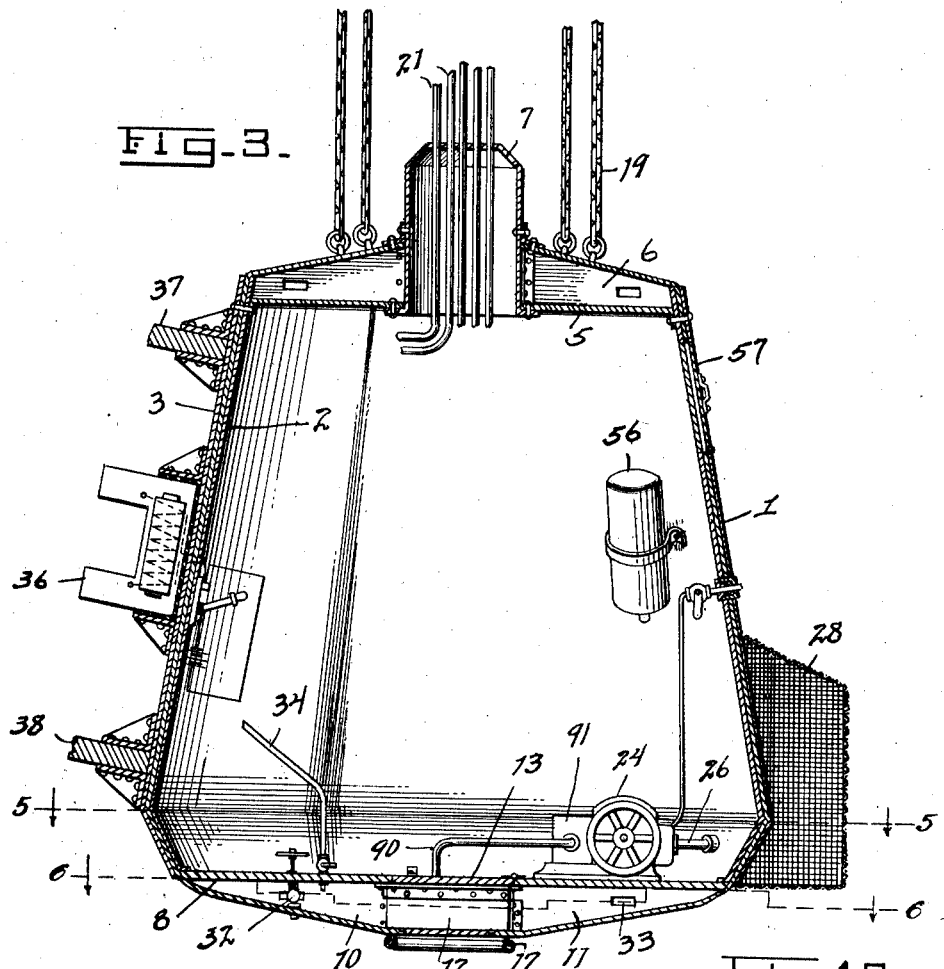
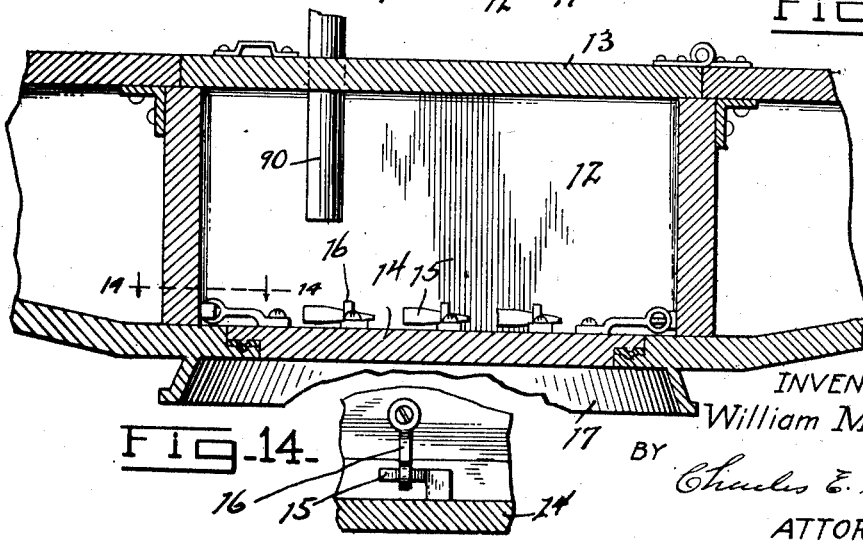
INVENTOR
William M Neeper.
BY
ATTORNEY.

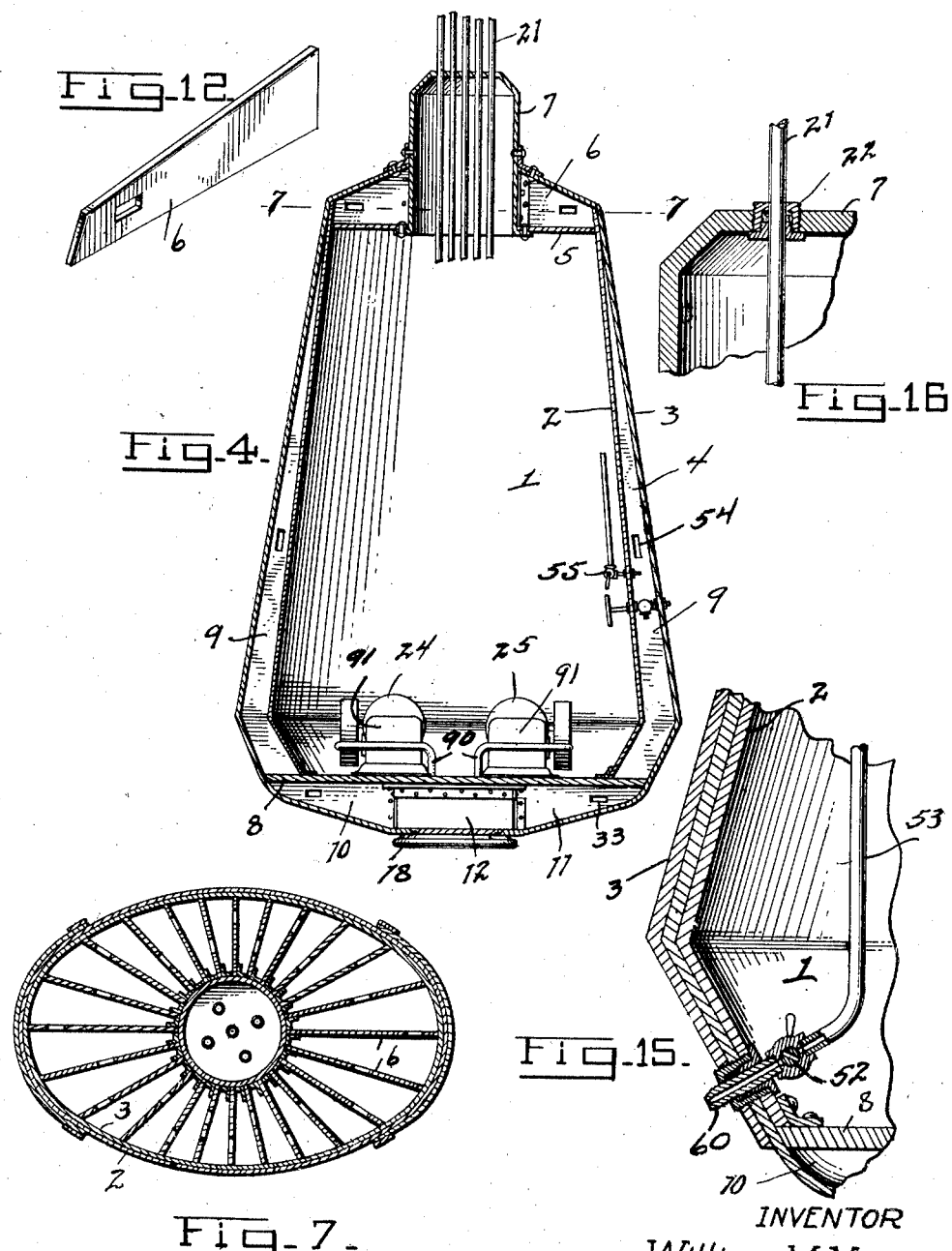

W. M. NEEPER.
WRECK SALVAGING APPARATUS.
APPLICATION FILED FEB. 8, 1919.
1,349,578.
Patented Aug. 17, 1920.
7 SHEETS—SHEET 5.
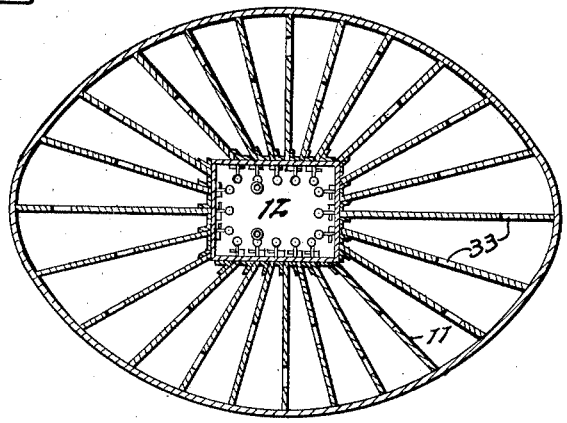
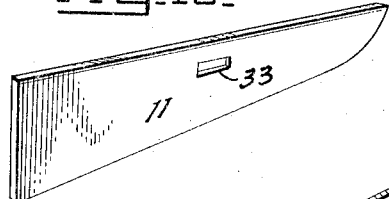
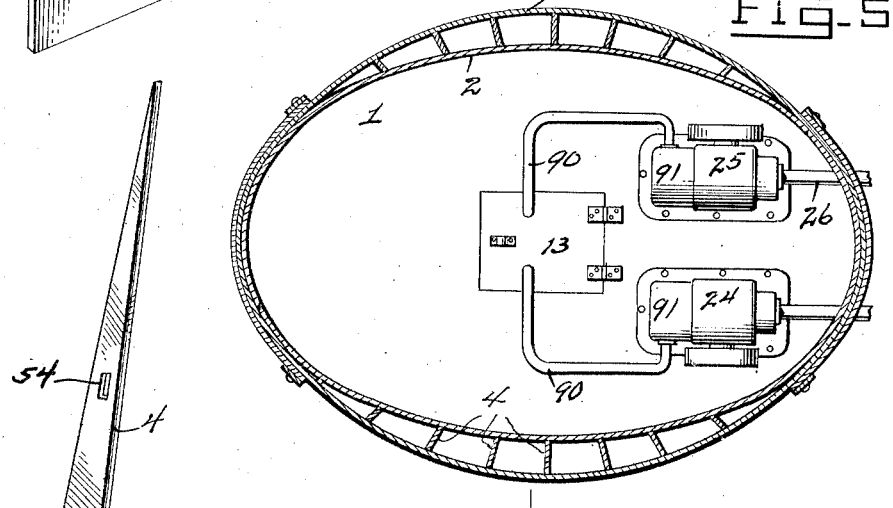
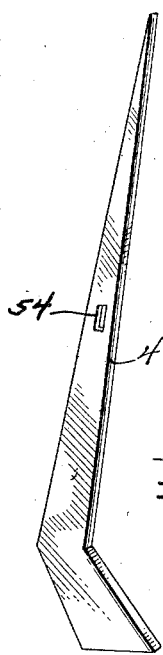
INVENTOR
William M. Neeper.
BY
*Charles E. Wiser*
ATTORNEY.

W. M. NEEPER.
WRECK SALVAGING APPARATUS.
APPLICATION FILED FEB. 8, 1919.
1,349,578.
Patented Aug. 17, 1920.
7 SHEETS—SHEET 6.
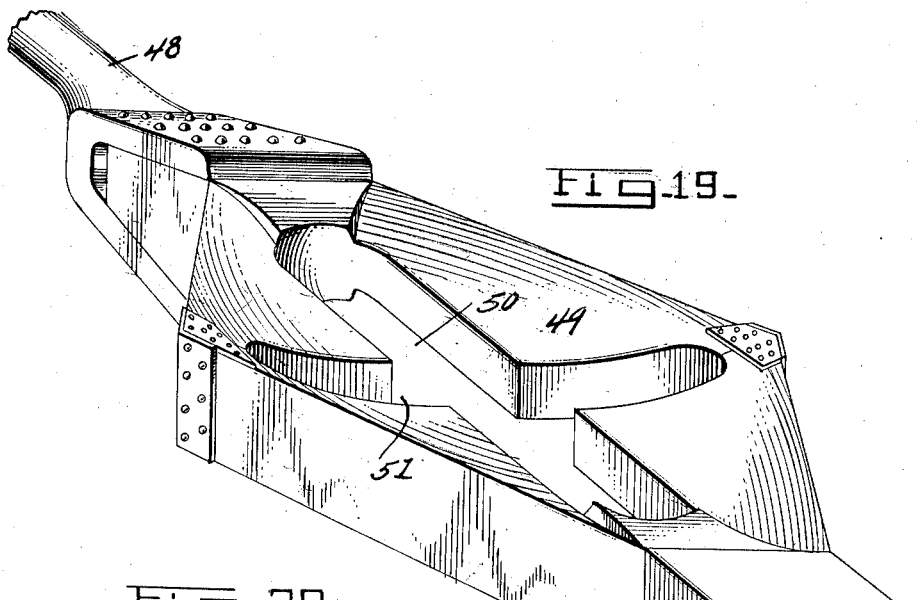
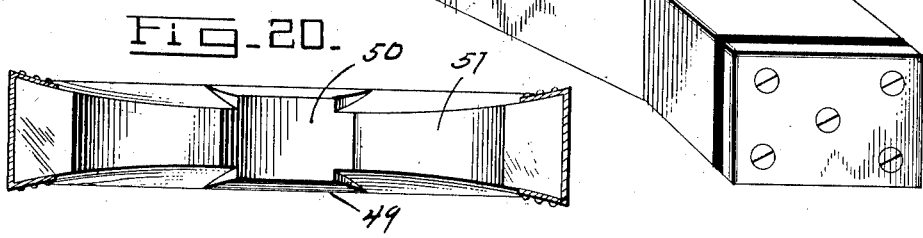
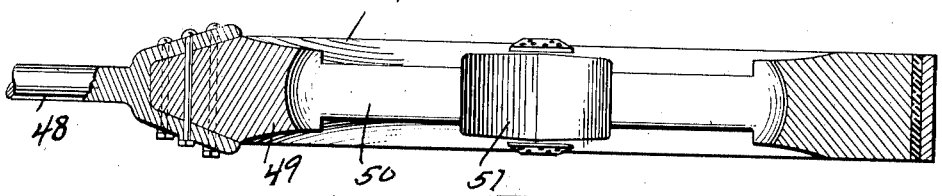
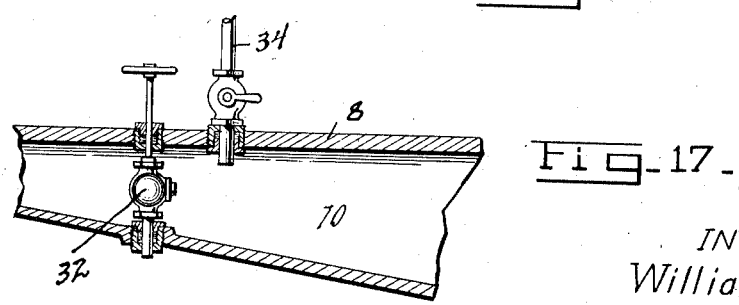
INVENTOR
William M. Neeper.
BY
Charles E. Wiener
ATTORNEY

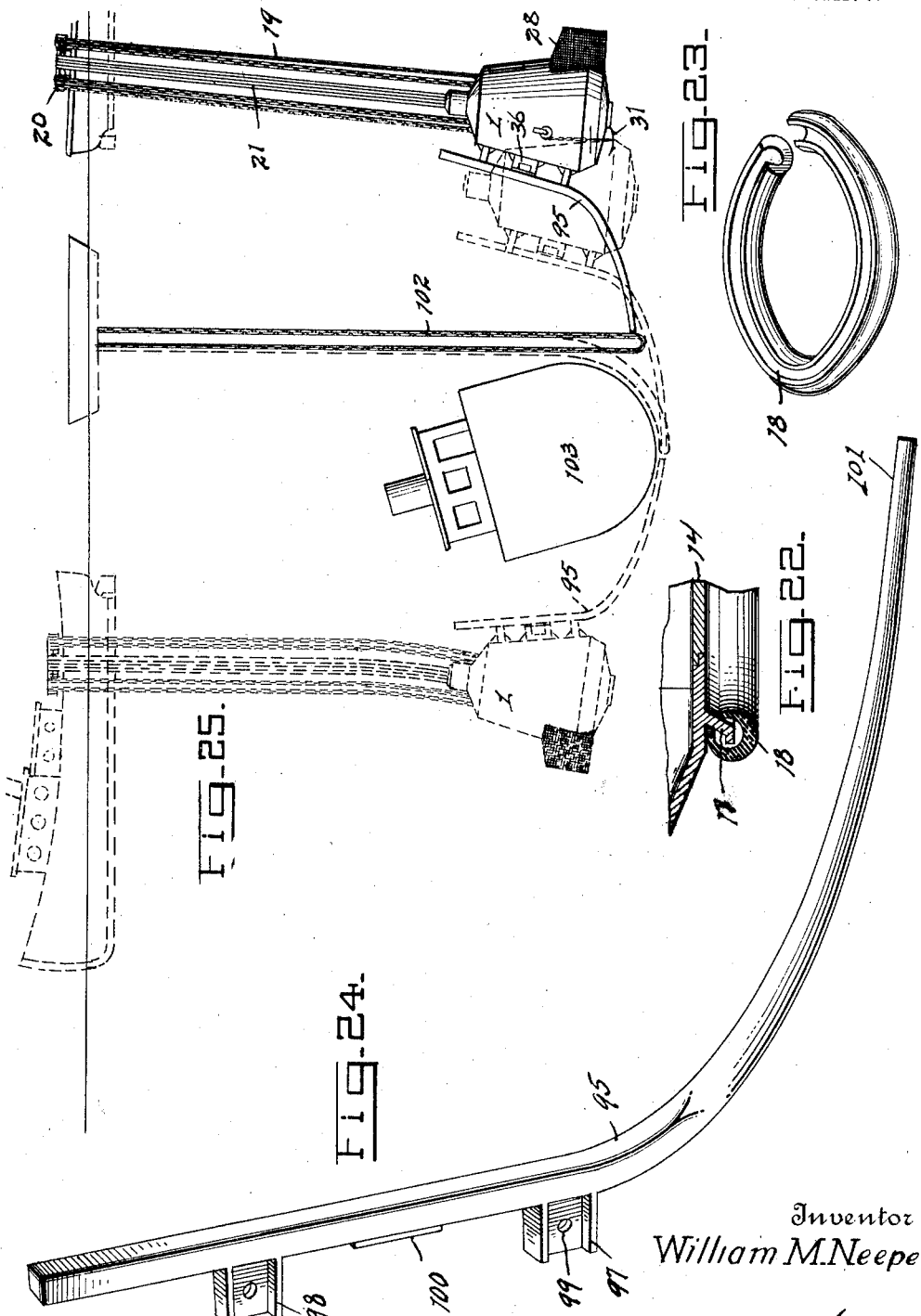

UNITED STATES PATENT OFFICE.

WILLIAM M. NEEPER, OF CAPAC, MICHIGAN.

WRECK-SALVAGING APPARATUS.

1,349,578.  Specification of Letters Patent.  Patented Aug. 17, 1920.

Application filed February 8, 1919.  Serial No. 275,728.

*To all whom it may concern:*

Be it known that I, WILLIAM M. NEEPER, a citizen of the United States, residing at Capac, county of St. Clair, State of Michigan, have invented a certain new and useful Improvement in Wreck-Salvaging Apparatus, and declare the following to be a full, clear, and exact description of the same, such as will enable others skilled in the art to which it pertains to make and use the same, reference being had to the accompanying drawings, which form a part of this specification.

This invention relates to wreck salvaging apparatus for use in raising sunken vessels and its object is to provide an apparatus of the character of a diving bell adapted to be controlled in its descent and ascent in the water principally by apparatus on a boat and by means of which tackle may be connected with a sunken vessel. Particularly the apparatus is of use not only in shallow water but at depths at which a diver cannot conveniently operate. The particular object of the invention is to provide a bell of the capacity to carry several persons and apparatus that to a considerable extent controls its position horizontally in the water and to provide means operating in conjunction therewith and adapted to be placed in position by movement and operation of the bell from the interior. An additional object of the invention is to provide tackle adapted to be electrically connected with the exterior of the bell whereby the same may be manipulated through movement of the bell to the necessary position relative to the sunken vessel. A further object is to provide a bell controlled from above in its movement into and out of the water and that is of rigid construction adapted to withstand the pressures encountered below the surface of the sea and further one that is provided with storage compartments for compressed air and apparatus whereby it may be utilized in clearing the bottom of a sunken ship from the mud in which it may lie. Further features of the invention are involved in the character of construction of the device providing a double wall of ovate form having the usual air tubes and electrical connection with the control apparatus at the surface of the water and apparatus for lowering or raising the device and provided with means as a motor controlled from the interior to propel the suspended device and to control its direction of movement. These objects and novel features and the several other characteristics of the invention are hereinafter more fully described and claimed and shown in the accompanying drawings in which—

Fig. 2 is an elevation of the diving bell on an enlarged scale, showing one form of grapple device.

Fig. 3 is a vertical section of the diving bell.

Fig. 4 is a similar section taken at a right angle to that shown in Fig. 3 and along the line 4—4 of Fig. 5.

Fig. 5 is a horizontal section taken on line 5—5 of Fig. 3.

Fig. 6 is a horizontal section taken on line 6—6 of Fig. 3.

Fig. 7 is a section taken on line 7—7 of Fig. 4.

Fig. 8 is a detail in section on line 8—8 of Fig. 2, showing the construction of the grappling device.

Fig. 9 is a section taken on line 9—9 of Fig. 2, showing the means of supporting the grappling device on the bell.

Fig. 10 is a detail of a rib used in the construction of the bottom of the device.

Fig. 11 is a detail of a vertical rib utilized between the two walls of the bell.

Fig. 12 is a detail of a horizontal rib used in the top of the bell.

Fig. 13 is a vertical section showing a compartment provided in the bottom of the bell.

Fig. 14 is a section taken on line 14—14 of Fig. 13.

Fig. 15 is a detail showing the discharge nozzle for compressed air provided near the bottom of the device.

Fig. 16 is a detail showing the character of connection of the air and other tubes to the dome with which the bell is provided.

Fig. 17 is a detail in section showing the valve arrangements provided in the compartment formed in the bottom of the bell.

Fig. 18 is a detail in section on line 18—18 of Fig. 2 showing the windlass controlling the position of the anchor with which the device is provided.

Fig. 19 is a detail in perspective of an end of a grappling hook through which a chain is adapted to run and on which it is adapted to bind.

Fig. 20 is a cross section thereof.

Fig. 21 is a longitudinal section thereof.

Fig. 22 is a detail of a cushion device utilized in the bottom of the bell.

Fig. 23 is a detail in perspective of the cushion.

Fig. 24 is a detail of a chain manipulating appliance.

Fig. 25 is a diagrammatic view showing the use of the chain manipulating apparatus in conjunction with the bell.

Figures 1, 1B:
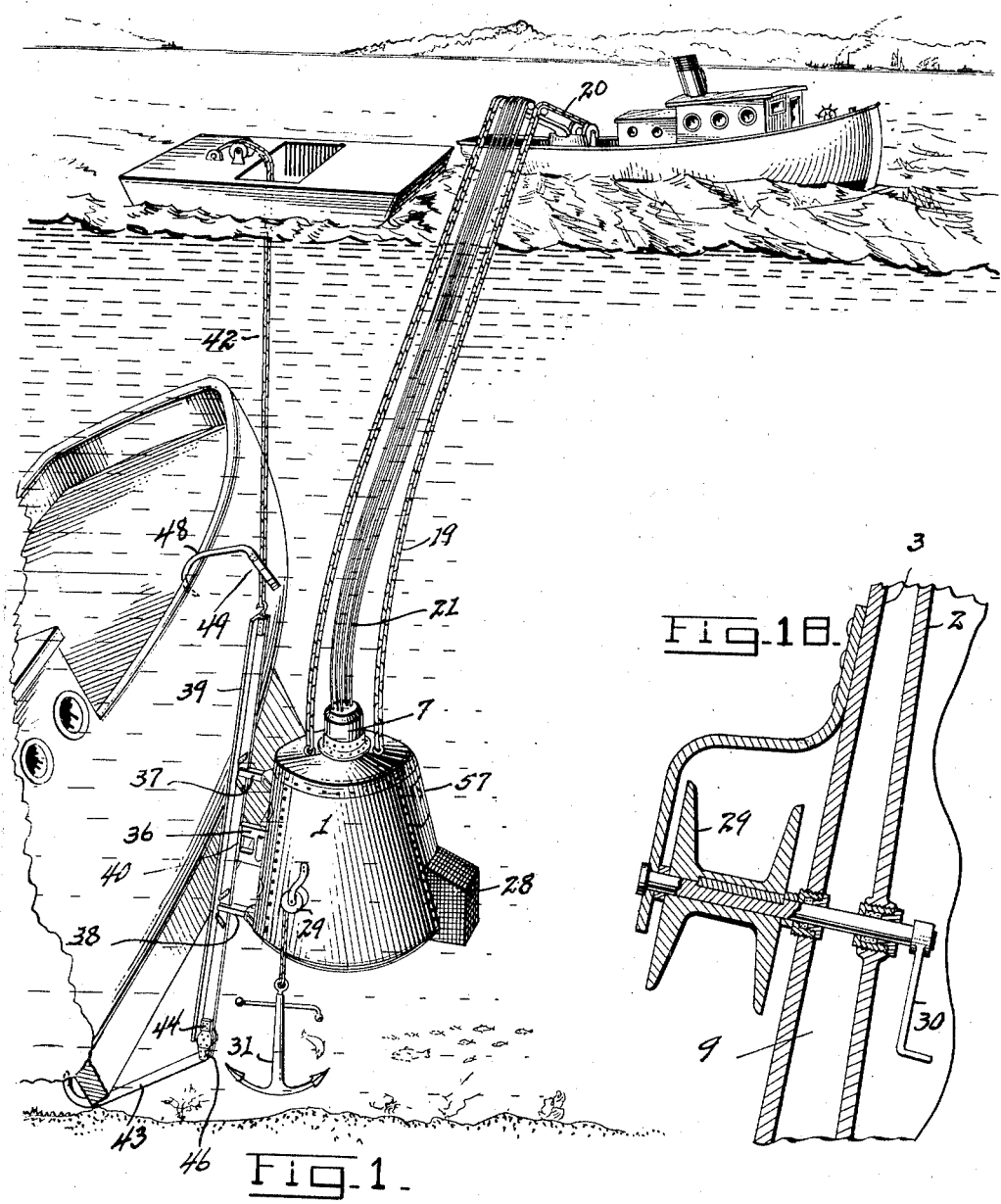
Figure 1 is a pictorial representation of my improved salvaging apparatus in use.

A fundamental purpose of the apparatus herein described is to provide a diving bell in which several persons may conveniently descend into the water and through control of the horizontal position of the bell to place grappling devices in the necessary positions about the sunken vessel, which devices are connected with pontoons at the surface of the water. The use of pontoons in the raising of sunken vessels is not new and I propose to use the ordinary pontoon adapted for this purpose. After the chains are fixedly connected with the sunken vessel, the pontoons, as is usual, are lowered in the water by pumping water thereinto, the slack in the chains being taken up during the period of lowering of the pontoons. Thereupon, the water is pumped out of the pontoons causing them to rise in respect to the surface of the water, and the pontoons are subsequently filled and lowered during which period the chains are kept taut by means provided on the pontoons (not here shown), and the pontoons emptied, and this filling and emptying is continued until the vessel has been raised to the required position for repair and water pumped out of the vessel and the vessel towed to dry dock or other position for permanent repair. This method of operation of pontoons chain or cable connected with the sunken vessel forms no particular part of this invention. Heretofore, in order to attach the chains to the vessels, divers were sent down who made the necessary connections of the grappling irons with the hull and this may be readily done in ordinary shallow water but in water that is agitated to any great extent, as by breaking upon a rocky shore, and at great depths, the sending down of a diver is extremely hazardous and oftentimes impossible.

This invention relates particularly to what I have termed a bell or diving apparatus containing machinery for manipulation of the bell and of devices controlled from the interior by means of which grappling irons of various forms may be positioned on the vessel and released from the bell, the grappling irons being connected in the usual way by a chain or cable with the pontoons after the manner above briefly mentioned. To this end therefore the invention consists of a bell 1 which is ovate in cross section as will be readily understood from Figs. 5, 6 and 7 and is provided with an interior shell 2 and an exterior shell 3, a sealed compartment being provided between the two shells and preferably the two shells are in contact at each end as shown particularly in Fig. 5 and have the same foci and intermediate these ends the outer shell is greater in width transversely than the inner shell. In the vertical section shown in Fig. 4, which figure is taken on line 4—4 of Fig. 5, it is to be noted that the said shells are a greater distance apart at the bottom than at the top, tapering ribs 4 being provided between the two shells and secured thereto in any approved manner. A ceiling 5 is also provided for the interior of the bell and above this ceiling is provided with radial ribs 6 about a central dome 7 which opens into the interior compartment through the said ceiling. The exterior shell 1 is continued over the upper edge of these ribs 6 and connects to the dome as shown and it is to be understood that these several shells are formed of parts riveted together after the manner of the formation of a boiler shell. The floor 8 of the inner compartment closes the chambers 9 between the inner and outer shells 2 and 3 and also forms one wall of a ballast compartment 10, the lower wall of which is formed in continuity with the external shell. Radial ribs 11 are provided on this bottom as shown in Fig. 6. Centrally of the bottom is provided a chamber 12 closed by means of a cover 13 in the floor of the device and a second cover 14 in the outer wall of the bottom. Both these covers should be sealable and lugs 15 are provided on the wall of the chamber and latch devices 16 on the cover 14 engaging the lugs as shown particularly in Fig. 14 to force and maintain the cover in place against pressure from the exterior. The lower wall of the device about the aperture closed by the cover 14 is provided with a flange 17 and on this flange may be positioned a rubber gasket 18 as shown in Figs. 22 and 23 adapted to engage over the flange and normally remain in place thereon. The purpose of this chamber will be hereinafter more fully described.

The device is lowered or raised in the water by means of cables or chains 19, several of which are attached to the upper end thereof and these cables are controlled by means of a windlass or other device of proper character indicated at 20 in Fig. 1 through operation of which the bell may be raised or lowered. Through the dome of the device are provided several flexible conduits 21 for compressed air, electric wires, an air escape, telephone, fresh air, etc. These conduits are connected through the wall of the dome by means of a gland 22 shown in Fig. 16, and it is to be understood that the compressed air tube opens into the chambers 9 between the inner and outer walls.

Preferably, I provide two motors 24 and 25 on the floor of the inner shell equidistantly disposed on opposite sides of a longitudinal center line, which are preferably electrical in form and may be of a gas engine type if provision be made to exhaust through a tube provided to the surface of the water. These two engines or motors are provided with shafts 26 extending through the outer wall of the device at one end as will be understood from Fig. 5, and propellers are provided on the exterior of the device as will be understood from Fig. 2. I also provide a rudder 27 intermediate the two propellers which are positioned each side of the longitudinal center of the floor of the device and these propellers and rudder are incased in a foraminous grating 28 attached to the exterior of the bell. When in the water the device, of course, is ordinarily suspended by means of the cable and windlass heretofore described but, by operation of the motors, the device may be swung on these cables and by operation of one or the other of the motors the device may be turned, the purpose of which is hereinafter described. I also provide a windlass 29 operable from the interior of the device as by means of a crank 30 and on this windlass is wound a cable carrying an anchor 31 so that when desired the bell may be anchored in position.

A valve 32 is provided in the lower compartment of the bell by means of which water may be let into the said compartment for purposes of ballast and for this reason the radial ribs 11 are provided with apertures 33 so that the spaces between the ribs are open one to the other and in order to relieve this compartment of the water, I have provided a valve controlled pipe 34 opening from one of the compressed air compartments formed at the side of the device to this chamber 10 and by means of which water may be forced out of the compartment and the valve 32 closed. At the forward end of the bell, opposite the end at which the propellers are provided, I provide a series of glass covered ports 35 through which the operators may observe the vessel or device that is to be operated on. At this forward end is also provided an electromagnet 36 the current for which is supplied from the surface boat and controlled by means of a switch in the interior of the bell. Stay members 37 and 38 are also provided on the exterior of the bell near the upper and lower ends respectively. These stay members are shown in detail in Fig. 9 and may be of any approved form, being here shown as bifurcated at the end to receive a rib for instance of the beam 39, shown in Fig. 2. This beam is provided with a keeper 40 and on each side of the beam are provided guide bars 41 which assist in positioning the beam in the stay members 38 and position the keeper 40 relative to the electromagnet 36. This beam member is positioned prior to the descent of the bell and when positioned the electric current is turned onto the magnet and the beam held in position by the magnet. The upper end of the beam is connected by means of the chain or cable 42 with the pontoon as shown in Fig. 1. The lower end of the keeper is provided with a hook 43 which may extend at an angle to the beam and is adjustable in position relative to the beam. For this purpose of adjustment the beam is provided with a terminal bifurcated member 44 having a series of apertures 45 circularly arranged therein. The hook has secured thereto a member 46 having a part insertible in the bifurcation of the member 44 and is correspondingly apertured to receive the bolts 47. By this arrangement the hook may be turned to various angles and secured to the beam as may be found desirable. This beam with the hook positioned thereon is connected with the bell in the manner stated and the bell lowered in position in the water to a point where the hook member 43 is at about the level of the keel of the boat as may be observed through the ports 35. The bell is lowered at one side of the sunken vessel and when it is found that the hook end is approximately at the level of the keel the bell may be propelled forward to swing it on the cables after the manner as indicated in Fig. 1 forcing the hook member 43 beneath the keel of the boat, whereupon the bell is allowed to swing back until the hook has caught. The cable member 42 is then tightened in the pontoon and the bell released from the beam by cutting the current off from the magnet which is thus deënergized. On this chain 42 is also a hook 48 adapted to engage over the gunwale of the boat and this hook member has a chain engaging portion shown in detail in Fig. 19. It is to be noted, as shown in Fig. 1, that this chain end of the hook lies at an angle to the body of the hook and, to enable the hook to pass readily along the chain, this end 49 must be positioned practically at a right angle to the chain in which position the links of the chain readily pass through the longitudinal and cross apertures 50 and 51. After the hook is engaged over the gunwale, however, and is dropped to an angle as shown in Fig. 1, this end 49 binds on the chain so that when pressure is applied to the chain to raise the vessel, the hook members 43 and 48 are held in position as is required.

Sunken vessels oftentimes lie in the silt or mud at the bottom of the sea and it is difficult to pass anything beneath the boat for this reason. In order to clear the keel of the silt and to expose the same to view to enable the hook members to be properly manipulated, I have provided a compressed air nozzle 60 at the forward end of the device at the bottom controlled by means of a valve 52 in the interior and this nozzle is connected by means of a tube 53 with a compressed air compartment 9, and a nozzle may be provided for both compressed air compartments or a single nozzle may be connected with both compartments on the two sides of the vessel and formed between the inner and outer wall thereof as is heretofore described. In operation the bell is brought close to the vessel at the bottom and air is discharged against the mud which is thus cleared away to an extent sufficient to enable the operators to position the grapple device. It is further often necessary to remove this mud for the reason that sometimes sunken boats lie so deeply in the mud as to prevent their being raised by any ordinary means, and this compressed air device enables the boat to be cleared.

The upper chamber formed above the ceiling and about the dome 7 is an air chamber and is provided for buoyancy particularly and is unconnected with the compressed air chamber 9 heretofore described. The vertical ribs 4 in these chambers are provided with apertures 54 connecting the spaces between the ribs one with the other and the two chambers 9 provided on opposite sides of the vessel and may be connected together if desired. These compressed air chambers 9 may have a valve connection 55 with the interior of the bell so that in case the fresh air connection through one of the tubes 21 is stopped for any reason some air may be introduced into the chamber 1, and the extra space provided by the dome 7 provides a space for accumulation of foul air. Foul air may be also taken from the interior through one of the tubes 21 and thus, in case of breakage of the air supplying apparatus normally used, fresh air could be introduced from the compressed air reservoir and foul air exhausted through one of the tubes. The apparatus may also be provided with all the usual paraphernalia as for instance an oxygen tank 56, etc., for use in emergencies. To enter the apparatus a properly sealed door member 57 may be utilized preferably at an end of the aperture where the inner and outer walls are united. The chamber 12 heretofore mentioned formed in the bottom of the bell may be utilized in various ways. The flange 17 heretofore mentioned has secured thereto a rubber gasket 18 as shown in Fig. 22 and the bell may be lowered directly over a sunken vessel and by manipulation of the interior motors positioned directly over a covered hatch for instance. The suspending cables may then be released to an extent to allow the bell to rest upon the hatch. By reason of contact of the gasket with the surface of the hatch, an area circumscribed by the flange 17 is sealed from the sea whereupon the cover members 13 and 14 may be taken up and an aperture cut in through the hatch cover. Compressed air may be delivered into the hatch by means of a pipe 90 extending into the chamber 12 and connected with compressors 91 that may be provided at the end of the motors. After the opening is cut through the hatch, the upper sealable cover 13 may be closed preventing water from entering the interior of the bell and the compressor operated to force water out of the compartment of the vessel opened through the said hatch or the entire bell may be filled with air at a pressure sufficient to prevent an ingress of water under which condition, the covers 13 and 14 being removed, a person may enter the vessel through the opening in the hatch.

Various grapples may be utilized and electrically connected with the exterior of the bell, one of which is shown at 39 in Figs. 2 and 9 and another of which is shown at 95 in Fig. 24. It is to be noted that the bifurcated end of the arms 37 and 38, which are permanently attached to the bell have apertures 96 therein. The grapple device 95 is provided with parallel arms 97 and 98 which are provided with apertures 99. This grapple device when the bell is at the surface of the water may be inserted with the arms 97 and 98 in the arms 38 and 37 respectively and a bolt inserted through the apertures 96 and 99 to permanently attach the grapple 95 to the bell. The grapple 95 is provided with a keeper 100 adapted to engage the electro-magnet 36 and by means of which the entire grapple may be magnetized. It is to be noted that the grapple has a long smooth end 101 and the use of this type of grapple is illustrated in Fig. 25 from which it will be seen that the chain 102 is let down from the pontoon and the bell (which has been positioned by means of its cables) is moved from the position shown in full lines at the right of Fig. 25 to the position shown in dotted lines in said side of the figure. The grapple member 95 being magnetized holds the chain in contact therewith and enables it to be pushed beneath the submerged vessel indicated at 103 which positioning of the chain is performed by manipulation of the bell under power of the motors therewithin. When the chain has been pushed through to its farthest possible extent the grapple is de-magnetized by cutting the current off from the electro-magnet 36 and the bell then allowed to swing back free from the vessel leaving the chain beneath the vessel. Several chains may thus be positioned along one side of the vessel whereupon the bell is taken to the opposite side as indicated by dotted lines at the left of Fig. 25, the grapple device again introduced beneath the vessel and being again magnetized by current, the chain may be picked up and drawn through by backing the bell away from the vessel and each previously positioned chain may be drawn upward from its position by raising the bell. It is to be understood that one part of the chain is fixed to the pontoon above and that, therefore, the chain will slide on the grapple and finally pull the loose end of the chain upward and all of the chains may thus be inserted beneath the vessel without necessity of actual hand manipulation by a diver let down from above in the usual manner.

It is thus evident from the foregoing description that, by means of the bell suspended from above and the vertical position determined by apparatus positioned at the surface of the water, various types of grappling devices may be secured to a vessel, and the vessel cleared from silt or mud at the bottom to enable the grappling devices to be positioned, at depths and in condition of water as regards movement that would be prohibitive for a person in the usual diving suit. Also due to the various types of grappling device possible of use with the bell and of the character of the bell itself and apparatus with which it is provided it is evident that the device is efficient in operation, substantial in construction and makes possible the raising of vessels from positions heretofore considered inaccessible.

Having thus fully described my invention, what I claim is—

1. In wreck salvaging apparatus, a suspended diving bell having the usual air and electric conduits leading to the interior, means for varying the position of the bell in a vertical plane in the water, means controllable from the interior for altering the position of the bell in horizontal plane, an electro-magnetic device, and a grapple comprising a beam member and an adjustable grapple device thereon, guides for positioning the beam on the bell, the magnetic device securing the beam to the bell, and a pontoon with which the beam is connected.

2. In wreck salvaging apparatus, a suspended diving bell equipped with an electrical system, means for varying the position of the bell vertically, electro-magnets, current for which is controlled from the interior, and a grapple device comprising a beam member having an armature for the magnet whereby the same may be positioned by movement of the bell, a pontoon, a cable connection between the pontoon and beam, and a hook member attached to the lower end of the beam adapted for insertion beneath wreckage.

3. In wreck salvaging apparatus, a suspended diving bell equipped with an electrical system, means for varying the position of the bell vertically in the water, means controllable from the interior for moving the bell in a horizontal plane, an electro-magnet on the exterior of the bell, means for controlling the current thereto from the interior to magnetize and demagnetize the magnet, and a grapple member providing an armature for the magnet, a hook member at the lower end thereof adapted for insertion beneath wreckage, a pontoon at the surface of the water, a cable connecting the pontoon and the beam, and a grapple hook slidable on the cable by gravity to engage the wreckage.

4. In wreck salvaging apparatus, a diving bell provided with an electrical system, an electro-magnet on the exterior of the bell controlled from the interior, a grappling device comprising a beam, a hook member adjustable in character connected with the lower end of the beam, guide members on the bell for the beam, the beam providing an armature for the magnet whereby the same is held to the bell, a pontoon, a cable connection between the pontoon and beam, and a grappling hook slidable on the cable by gravity.

5. In wreck salvaging apparatus, a diving bell adapted to be moved vertically in the water, means for moving the bell horizontally in the water, an electro-magnet on the exterior of the bell, the magnetization and demagnetization of which is controlled from the interior, a beam of a character to provide an armature for the magnet whereby the same may be detachably connected with the bell and handled or manipulated by movement of the bell, a hook member at the lower end of the beam adjustable in its position in angular relation to the longitudinal axis of the beam, movement of the bell enabling the beam and hook member to be positioned relative to the wreck, a pontoon, and flexible connection between the pontoon and beam independent of the bell.

6. Apparatus for raising sunken vessels comprising the combination with a diving bell electrically equipped and operable by its own power and adapted to be raised or lowered vertically in the water, an electro-magnet mounted on the exterior of the bell, magnetization and demagnetization thereof being controlled from the interior, guide members above and below the said magnet, a grapple device comprising a beam member having an armature for the magnet and adapted to engage the upper and lower guide members to hold the beam substantially vertical, a chain or cable by means of which the beam may be independently connected with a pontoon or the like, a hook member at the lower end of the beam, movement of the bell by its power positioning the hook member beneath the vessel, and the chain holding the beam in substantially vertical position along side the vessel after being released from the bell.

7. A diving bell of frusto-conical form having inner and outer shells ovate in cross section, the shells being in contact on the line of the greatest diameter and spaced apart intermediate the lines of contact providing compartments, ribs extending vertically between the two shells in the compartments, said ribs being apertured to open the entire compartment to a storage of air, a separate compartment at the bottom of the said shells and a separate compartment at the ceiling, and apertured ribs between the walls of each of the said compartments.

8. A diving bell of substantially frusto-conical form having inner and outer shells substantially ovate in cross section, the shells being in contact on the line of greatest diameter and spaced apart intermediate the line of contact providing independent chambers on opposite sides of the bell, a chamber formed at both the top and bottom of the shells, said chambers being sealed from the said chambers and from the interior of the shell, and a separate compartment at the ceiling substantially as and for the purpose described.

9. A diving bell of frusto-conical form and ovate in cross section having inner and outer shells, the short diameter of the outer shell being greater than the short diameter of the inner shell providing compartments between the shells, the bell having an air compartment at the top and a sealed compartment at the bottom of the bell, means for allowing water to flow into the said bottom compartment, and means for discharging compressed air into the compartment to discharge the water.

10. A diving bell of frusto-conical form having inner and outer shells ovate in cross section, the shells being in contact on the line of greatest diameter and spaced apart intermediate said ends providing compressed air compartments, the said compartments being of greatest width at the bottom tapering toward the top, the shells being in engagement at the top, a closed air space at the upper end of the device and a closed chamber at the bottom of the device, means for introduction of water into the said lower chamber, means for discharging compressed air thereinto, and means for opening the compressed air compartments to the interior of the bell.

11. A diving bell of frusto-conical form having inner and outer shells ovate in cross section, the shells being in contact at the ends on the line of greatest diameter and spaced apart intermediate the ends providing compartments, observation ports at one of the said ends and propelling devices at the other of said ends, means controlled from the interior for operating the propelling devices, an exterior anchor operable from the interior, and grappling devices, electro-magnetically connected with the exterior, the observation ports enabling the operator on the interior to determine the desired operation of the grapple, anchor, etc.

In testimony whereof, I sign this specification.

WILLIAM M. NEEPER.